Aug. 4, 1931.  F. W. SPERR, JR  1,817,778
PROCESS FOR PURIFYING AIR CONTAINING HYDROGEN SULPHIDE
Filed May 18, 1927
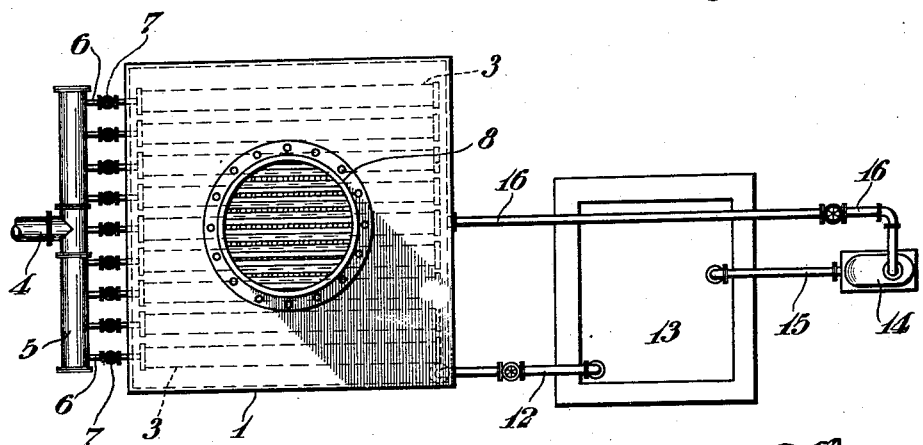
Fig.1
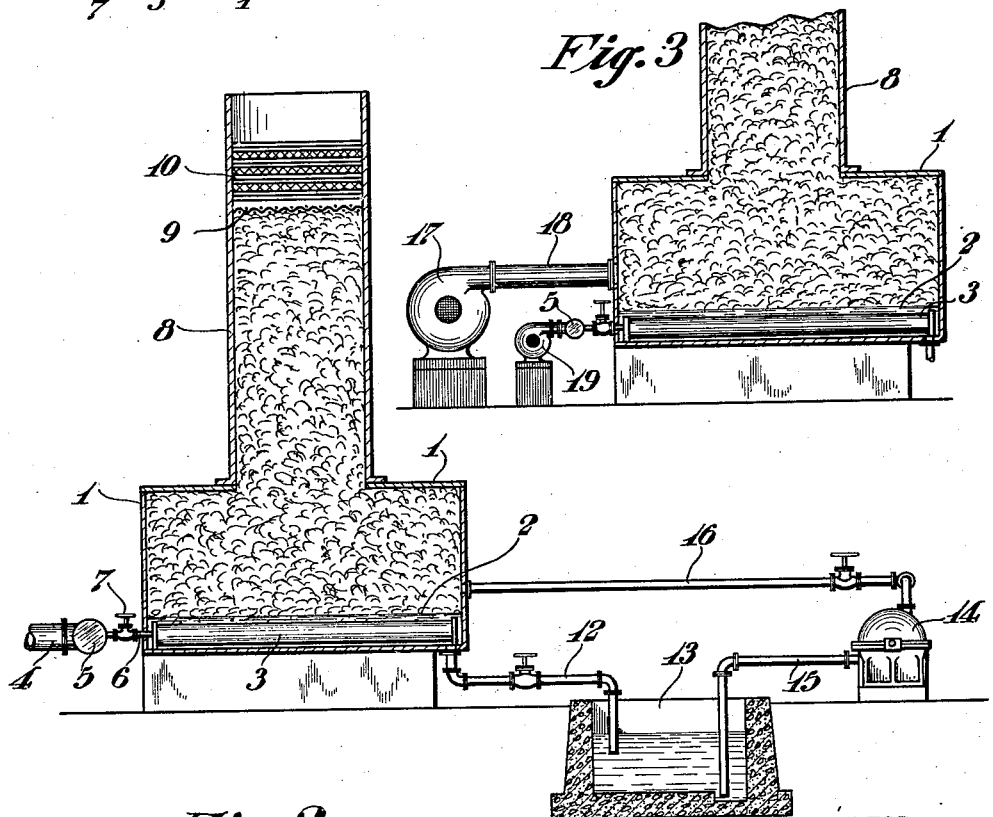
Fig.2
Fig.3
INVENTOR
Frederick W. Sperr Jr.
BY
Jesse R. Langley
ATTORNEY Patented Aug. 4, 1931

1,817,778

UNITED STATES PATENT OFFICE

FREDERICK W. SPERR, JR., OF PITTSBURGH, PENNSYLVANIA, ASSIGNOR TO THE KOPPERS COMPANY, A CORPORATION OF DELAWARE

PROCESS FOR PURIFYING AIR CONTAINING HYDROGEN SULPHIDE

Application filed May 18, 1927. Serial No. 192,209.

This invention relates to the purification of air or other oxygen-containing gas from hydrogen sulphide, hydrogen cyanide and analogous acidic impurities. The invention has a particular relation to the purification of air containing relatively small amounts of such impurities.

An object of my invention is to provide a process and apparatus for the purification of an oxygen-containing gas, such as air, from impurities of the character indicated and wherein purification of said gas or air from small amounts of hydrogen sulphide may be effected by means of the use of relatively small amounts of absorbent liquid without recirculation of the latter.

A further object of my invention is to provide effective process and apparatus for purifying large amounts of air containing small amounts of hydrogen sulphide without subjecting the bulk of the air to high pressures.

A further object of my invention is to provide means effective to convert an absorbent solution substantially entirely into the form of a froth and to bring such froth into contact with gas to be purified.

My invention has for further objects such other operative advantages or results as may be hereinafter found to obtain.

The purification of fuel gases and the like from hydrogen sulphide and hydrogen cyanide by means of alkaline solutions containing compounds effective upon aeration of the fouled absorbent solution to convert the absorbed hydrogen sulphide to sulphur is well known. Alkaline suspensions of iron oxide and nickel sulphide have been employed for this purpose, being recirculated through an absorption stage wherein the impurities were absorbed from the gas and through an actification stage wherein the solution is treated with an oxygen-containing gas to cause the liberation of the absorbed hydrogen sulphide as free sulphur. The hydrogen cyanide, as well as some of the hydrogen sulphide, is converted into fixed compounds, such as sodium thiocyanate. Comparatively large amounts of the alkaline suspension are required and only a limited surface of the suspension is exposed to the gas containing the hydrogen sulphide.

I have discovered that, if gas containing hydrogen sulphide is exposed to the action of an impurity-absorbent solution when the latter is in the form of a foam or froth, the vastly increased surface of the liquid in such form will be effective to accomplish the purification of such gas with relatively small quantities of such liquid. I have further discovered that the presence of certain frothproducing substances and especially those substances which are capable of promoting a relatively thick and permanent froth is of material benefit in the process.

Furthermore, my invention lends itself particularly to the purification of an oxygenbearing gas, such as air, since purification of the gas and actification of the suspension may be carried out concurrently without recirculation.

In order that my invention may be clearly set forth and understood, I will now describe, with reference to the accompanying drawings, the preferred manner in which it is embodied and practiced.

In these drawings,

Figure 1 is a plan view of apparatus for the purification of air;

Fig. 2 is a vertical sectional view of the apparatus shown in Fig. 1; and

Fig. 3 is a vertical sectional view of apparatus for purifying air including means for releasing an absorbent froth into the path of gas maintained at relatively low pressure.

Similar characters of reference indicate similar parts in each of the several views of the drawings.

When the air or gas to be purified is not excessive in amount and back pressures of, for example, from 6 to 12 inches are not objectionable, the apparatus shown in Figs. 1 and 2 may be advantageously employed. Such apparatus consists of a chamber 1 which may be of rectangular configuration and which is adapted to contain a body of absorbent liquid 2. Immersed in said absorbent liquid are a plurality of foraminous aerators 3, for example, the tubular vibratile aerators described and claimed in the copending application of Gilbert E. Seil, Serial No. 21,978, filed April 9, 1925, and assigned to The Koppers Company. The air to be treated is introduced under compression through a conduit 4 and manifold 5 to the aerators 3 through individual supply conduits 6, each of which is provided with a valve 7.

Immediately above the chamber 1 is situated a tower 8, preferably of cylindrical configuration and so arranged that the interiors of the chamber 1 and the tower 8 are substantially continuous. The tower 8 is provided with a coarse screen 9 and a plurality of hurdles 10 that are situated at some distance from the chamber 1. The chamber 1 is provided with a valved drain conduit 12, which leads into a sump 13. A return pump 14 is provided for withdrawing liquids from the sump 13 through a conduit 15 and returning them through a valved conduit 16 to the interior of the chamber 1.

An absorbent liquid is maintained within the chamber 1 in such amount as to form a shallow body of liquid whose level when quiescent is from 6 to 12 inches above the aerators 3. This absorbent liquid may be any of such absorbent suspensions or solutions as are employed for the purification of fuel gas according to any of the so-called sulphur-recovery processes, but, in addition to the alkali and metallic compound or catalyst or other agent, contains sufficient froth-producing material, such as saponin, licorice, sodium oleate, sodium resinate or the like, to convert the liquid into the form of a relatively thick and permanent froth when agitated.

A specific example of such a liquid is comprised of a 1 to 2% suspension of iron oxide in a solution of from 1 to 3% of sodium carbonate, containing sufficient froth-promoting agent to induce the formation of large amounts of froth. However, I do not limit myself to such a solution, for other liquids, alkalies and metallic compounds may be employed, in suspension or solution, so long as the liquid used is capable of absorbing hydrogen sulphide and will not release it as such upon aeration.

When the air to be treated is passed under pressure through the foraminous aerators 3, emerging in finely comminuted form into the body of liquid 2, it is effective to cause a violent agitation of the liquid and, in the presence of the froth-producing constituents of the liquid, causes the liquid to assume the form of a froth. This froth substantially completely fills the interior of the chamber 1 and the interior of the tower 8, but is restrained from being carried out of the apparatus by means of the screen 9 and hurdles 10.

The absorbent liquid is thus exposed in films of vast surface area to the gas and is effective to remove even minute amounts of hydrogen sulphide therefrom, while the oxygen contained in said gas effects a regeneration of the liquid in situ.

When it is desired to renew the absorbent liquid, the gradual consumption of which is caused by the currents of side reactions, mechanical losses and the like, or to remove the products of such side reactions or sulphur therefrom, the liquid may be withdrawn from the chamber 1 through the conduit 12 into the sump 13, where it may be treated to recover constituents or discarded. Further amounts of alkali, metallic compound or other purifying agent may be added to the sump 13 and fresh suspension prepared therein which may then be introduced to the chamber 1 by means of pump 14 and conduits 15 and 16.

In certain instances, such as, for example, in the spinning rooms of artificial silk plants, hydrogen sulphide is present in small amount while the amount of air thus contaminated and which it is desired to purify may be very large indeed. In such instances, it may be undesirable to compress such air or such portions of it as are to be treated sufficiently to withstand a back pressure of several inches of water. I have overcome this objection by providing the apparatus shown in Fig. 3, wherein the bulk of the air to be purified is blown at substantially normal pressures through a body of froth which is produced from an absorbent liquid by means of supplementary agitation or aeration means.

The apparatus employed for this purpose is similar to that shown in Figs. 1 and 2, except that in the present instance, the bulk of the air to be purified is introduced to the chamber 1 under very low pressure, by means of a fan 17 and conduit 18. A small portion of the air is compressed by a compressor 19, and passes through a conduit 20 into the manifold 5 and aerators 3. Sufficient air is compressed to induce the formation of large quantities of froth, which fill the interior of the chamber 1 and tower 8, and effectively scrub the low pressure gas passing therethrough. In this manner, considerable savings in blowing costs may be effected.

My invention is not limited to the specific examples shown herein by way of example, for other types of contact apparatus and other auxiliary froth-producing means may be employed.

My invention presents a very advantageous method and apparatus for purifying large amounts of air from small amounts of hydrogen sulphide in which relatively small amounts of absorbent solution may be effectively utilized and in which recirculation of the liquid and compression of the bulk of the air to be purified may be avoided.

My invention is not limited to the specific examples illustrated herein by way of example but may variously be embodied within the scope of the following claims.

I claim as my invention:

1. A process of treating air to remove hydrogen sulphide therefrom, which process comprises passing air containing hydrogen sulphide through a relatively deep layer of thick foam containing a suspension of a metallic compound in an alkaline solution which is adapted to react with the said hydrogen sulphide and remove it from the air, and maintaining the said compound in the said layer of foam while continuing the passage of hydrogen sulphide-containing air therethrough at a relatively low pressure.

2. A process of treating air to remove hydrogen sulphide therefrom, which process comprises passing air containing hydrogen sulphide at a low pressure through a relatively deep layer of thick foam containing a suspension of a metallic compound in an alkaline solution which is adapted to react with the said hydrogen sulphide and remove it from the air, and passing a supplementary air supply through a body of liquid containing the said compound and solution to maintain the said compound in the said foam layer.

In testimony whereof, I have hereunto subscribed my name this 16th day of May, 1927.

FREDERICK W. SPERR, Jr.